United States Patent [19]

Miller

[11] 3,770,009

[45] Nov. 6, 1973

[54] SENSITIVE CHECK VALVE

[75] Inventor: Richard W. Miller, Denton, Tex.

[73] Assignee: Victor Equipment Company, Denton, Tex.

[22] Filed: Dec. 29, 1971

[21] Appl. No.: 213,383

[52] U.S. Cl........... 137/543.19, 137/515.5, 251/368
[51] Int. Cl............................................. F16k 15/02
[58] Field of Search................. 137/516.25, 516.27, 137/516.29, 535, 538, 540, 515, 515.3, 515.5, 515.7; 251/368, 543.19

[56] References Cited
UNITED STATES PATENTS

| | | | |
|---|---|---|---|
| 2,930,401 | 3/1960 | Cowan | 137/540 |
| 3,524,469 | 8/1970 | Jebe | 251/368 X |
| 1,698,156 | 1/1929 | Dorsey | 137/516.25 |
| 2,931,385 | 4/1960 | Carlisle et al. | 137/540 X |
| 3,238,968 | 3/1966 | Pecis | 137/556 |
| 3,548,868 | 12/1970 | Mullaney | 137/516.29 X |

FOREIGN PATENTS OR APPLICATIONS 1,011,376   11/1965   Great Britain...................... 137/535

*Primary Examiner*—Robert G. Nilson
*Attorney*—William T. Wofford

[57] ABSTRACT

A check valve characterized by a lightweight valve member and a weak biasing spring such that it opens and reseats with a low differential pressure of only about three ounces per square inch thereacross, preferably less. The check valve may be used in high pressure applications, yet has structure and low engineering tolerances such that it may have the desired flow with very low differential pressure drop across the valve member, and it may be employed in applications such as welding or cutting torches, without inducing flutter into the flame of the torch. In specific embodiments, the check valve is lightweight for balancing of the torch, and is color coded for use with a specific gas.

6 Claims, 5 Drawing Figures

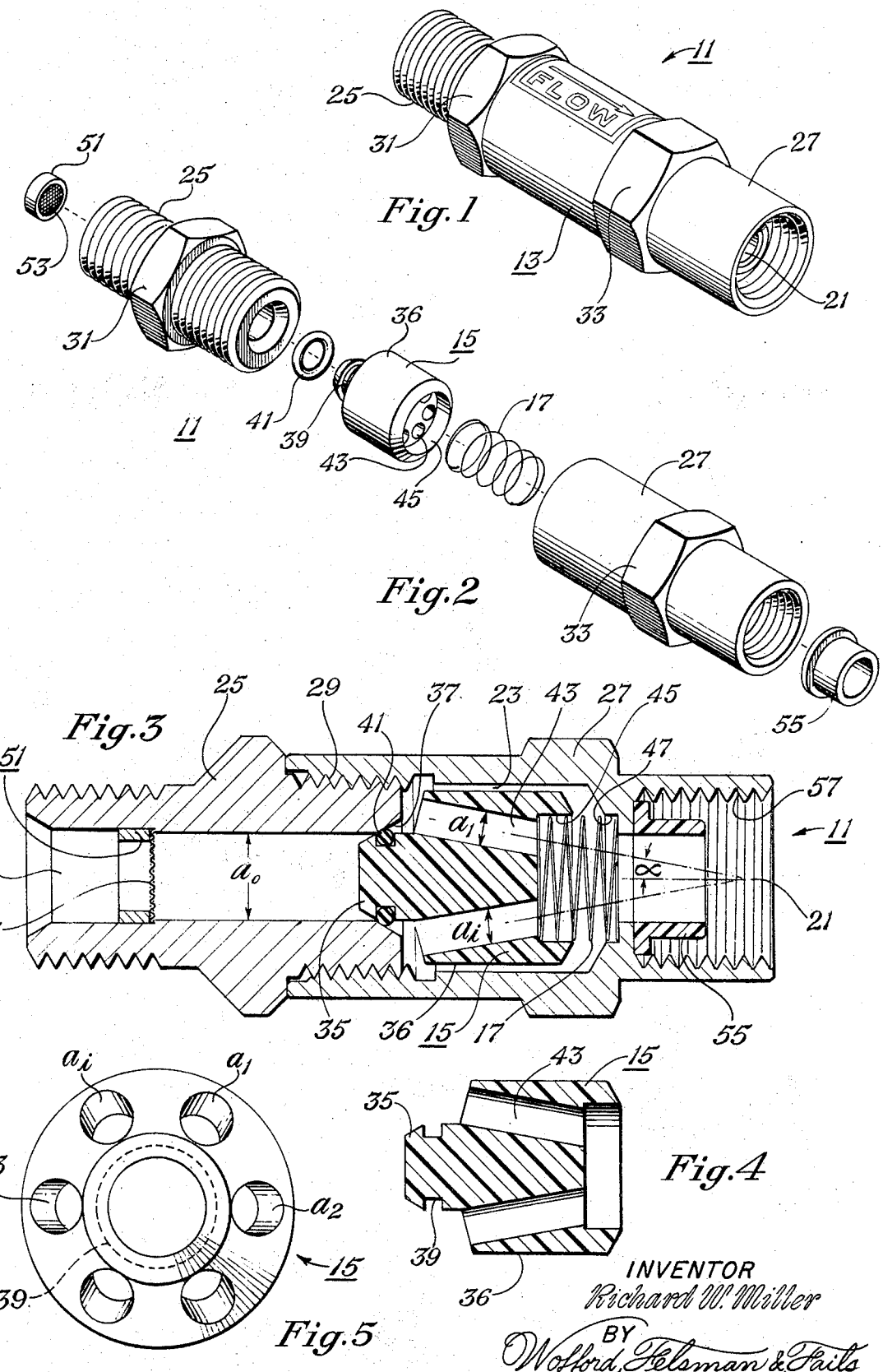

SENSITIVE CHECK VALVE

BACKGROUND OF THE INVENTION

1. Field of the Invention

This invention relates to check valves; and, more particularly, to check valves having low-inertia characteristics such that they will open or reseat with a very low differential pressure across the valve member.

2. Description of the Prior Art

A wide variety of check valve structures have been employed in the prior art. These check valves have ranged from the larger clapper valves, through the ball-type check valves, to the specialty check valves. Patents such as U.S. Pat. Nos. 2,675,021; 2,931,385; and 3,072,143 typify such prior art check valves. Insofar as I am aware, however, the prior art check valves did not provide a check valve with one or more of the following desirable features: (1) a check valve that had a low "cracking," or opening, and reseating pressure of about three ounces per square inch or less; preferably, about one ounce per square inch; that is, a check valve that would open if a differential pressure of three ounces per square inch existed in the forward flow direction or would close if a differential pressure of three ounces per square inch or less existed in the reverse flow direction; (2) a check valve that was useable in high pressure applications, yet had low engineering tolerances and a low differential pressure drop on normal flow of gases therethrough such that it could be employed in such sensitive applications as welding and cutting torches without inducing flutter into the torch flame; (3) a check valve that was lightweight so as not to interfere with the balance of a welding or cutting torch; (4) a check valve that was color coded for the respective fluid with which it would be employed to alleviate problems through mistaken identity of the lines and the like; and (5) a check valve that could be employed with medical gases, such as oxygen.

BRIEF DESCRIPTION OF THE DRAWINGS

FIG. 1 is an isometric view of the check valve in accordance with one embodiment of this invention.

FIG. 2 is an exploded view of the embodiment of FIG. 1.

FIG. 3 is a cross sectional view of the embodiment of FIG. 1.

FIG. 4 is a cross sectional view of the valve member of FIG. 3.

FIG. 5 is a front elevational view of the valve member of FIG. 4.

DESCRIPTION OF PREFERRED EMBODIMENT(S)

It is an object of this invention to provide a check valve having one or more of the desirable features delineated above and not heretofore provided in the prior art check valves.

It is another object of this invention to provide a check valve having all of the desirable features delineated hereinbefore.

These and other specific objects will become apparent from the following detailed descriptive matter taken in conjunction with the drawings.

Referring to the figures and, particularly, FIGS. 1–3, a check valve 11 comprises main subassemblies of a body 13; a valve member 15 that is formed of a lightweight material so that it will have a low inertia; and a weak biasing means 17. The lightweight valve member 15 and the weak biasing means 17 are chosen such that the check valve will open or reseat with a differential pressure of three ounces per square inch or less of differential pressure in the forward or reverse directions, respectively.

The body 13 is tubular in construction and has longitudinally extending bores 19 and 21 at each end, with a valve chamber 23 intermediate each end. As illustrated, the bore 19 is disposed in a first portion 25 at the inlet end and the bore 21 is disposed in a second portion 27 at the discharge end. The first and second portions are joined by means of a conventional sealing threaded connection 29 to facilitate insertion or replacement of the valve member 15 and biasing means 17. The respective first and second portions have conventional hexagonal shoulders 31 and 33 to facilitate being tightened by a suitable wrench, such as a crescent wrench. The body 13 may be formed of any material that is conventional in this art and commensurate with the nature of the fluid and the pressure range and the application in which the check valve will be employed. For example, with a conventional non-corrosive fluid, the body of the check valve may be formed of almost any of the metallic alloys such as the iron alloys. If it is important that the check valve resist corrosion or oxidizing effects of the fluid being passed therethrough, it may be made of a corrosion resistant alloy such as stainless steel or a copper alloy. One embodiment of the check valve is employed in conjunction with a cutting or welding torch employing oxygen and a fuel-gas. In this embodiment, I have found it particularly advantageous to employ anodized aluminum for two reasons. Firstly, the aluminum is lightweight and may be employed with a torch without upsetting the balance of the torch. Secondly, the aluminum may be anodized such that the body of the check valve will be color coded on its exterior to ensure that a careful workman will install it on the correct line and will know which line to release the couplings in the event that work must be done on one of the lines, such as the oxygen or the fuel-gas line. Moreover, the aluminum body will conduct gases such as oxygen without appreciable corrosion, since the aluminum forms a protective aluminum oxide film over the parts exposed to the flow of oxygen. In fact, the aluminum body is excellent for passing of fluid used for medical purposes; for example, oxygen for use with patients requiring oxygen.

The valve chamber 23 is machined into the body 13 with an unusually close engineering tolerance in order to eliminate oscillations of the valve member 15 with the objectionable pulsations, as described in the aforementioned U.S. Pat. No. 3,072,143. That patent described a solution to the problem, the solution requiring relatively elaborate and protruding spring means therein. The prevention of the oscillations is necessary in such sensitive applications as use with a cutting or welding torch to prevent flutter in the torch's flame. A conventional engineering tolerance in making check valves is a plus (+) or minus (−) 0.005 inch. I have found it necessary to employ an engineering tolerance of +0.000 to −0.005 inch to provide the requisite close fit and eliminate flutter of the lightweight valve member, or poppet, 15.

The valve member 15 is illustrated in FIGS. 2–5. The valve member 15 has a base portion 36 that conformingly fits within the valve chamber 23 with a low engineering clearance that is sufficiently small that flutter of the lightweight valve member 15 is prevented. The valve member 15 has a reduced portion serving as the nose portion 35. The nose portion 35 is adapted to seat within a seat 37 surrounding the inlet bore 19. The nose portion 35 has an annular recess 39 into which an O-ring 41 is fitted. The O-ring 41 effects a seal against seat 37 to prevent backflow of fluids therepast. Any other of the conventional seal means may be employed as long as it effects the requisite seal at the low differential pressure that effects the reseating of the valve member 15. This characteristic requires a particular range of durometer hardness of the sealing member, such as the O-ring 41. For example, I employ an O-ring having a durometer hardness of about 70 to effect the seal. The seat is finished with a number 64 microfinish to obtain a close fit and prevent leaking at the low differential pressure.

To provide a valve member that would reseat with the low differential pressure needed in the specialized applications noted hereinbefore, I found it necessary to employ a material having a density, or specific gravity, of less than 2.5 grams per cubic centimeter (gms/cc). In fact, despite warnings by experienced engineers that the thermoplastic materials would extrude under high differential pressures, I have found it particularly advantageous to employ the thermoplastic materials in manufacturing the valve member 15. The plastic Delrin was selected over Nylon and Orlon, because of its increased rigidity. Orlon and Nylon may be employed, however, where the differential pressure thereacross does not effect deformation and extrusion thereof.

The thermoplastic material such as Delrin, Orlon and Nylon are compatible with almost any fluid ranging from acetylene to medically employed gases, such as oxygen; and forms an excellent partner with the aluminum body discussed hereinbefore.

One of the problems encountered with the lightweight valve member 15, however, is the tendency to oscillate and induce flutter into the flame of a torch with which it is employed. Surprisingly, I have found this tendency to flutter can be overcome by two precautionary measures in the manufacture of the valve member. First, passageways 43 are provided longitudinally through the valve member 15 to carry the fluid flow through the valve member, instead of around it, and minimize turbulence; and, secondly, the external dimensions of the valve member 15 are effected with lower than usual engineering tolerances which, in conjunction with the close tolerances maintained on the valve chamber 23 of the body 13, alleviate problems with oscillation of the valve member 15.

Specifically, the valve member 15 has a plurality of longitudinally extending passageways 43. The total area of the longitudinally extending passageways 43, represented by the summation of the areas $a_1 + a_2 + ... + a_1$, is equal to the total cross sectional area $a_0$ such that there is very little pressure drop experienced across the valve member 15 in normal flow of fluid therethrough. Moreover, the longitudinal axes of the respective longitudinally extending passagewas 43 make an angle $\alpha$ with the longitudinal axis of the valve member 15 that is less than 30° to minimize the turbulence associated with the flow of fluid therethrough.

The external dimensions of the valve member 15 are controlled form a +0.003 to −0.000. In this way the clearance between the valve member 15 and the interior walls of the valve chamber 23 in the valve body 13 is, ordinarily, only about one-half the normal engineering tolerance employed with conventional check valves.

The weak biasing means 17 is illustrated as a weal coil spring. Because of the low inertial mass of the valve member 15, I have been able to employ a surprisingly lightweight spring to effect the requisite reseating such that the low opening pressure is not adversely affected. The weak biasing means, such as the coil spring 17, may be produced from materials that are commensurate with the fluid being flowed therepast. For example, I have found that a stainless steel spring having a wire size of 0.008 inch may be employed to give a loading of only 0.0038 pounds to 0.0042 pounds at 7/16 inch length, or 0.026 pounds per inch, when employed with a Delrin valve member having an outside diameter of 0.400 inch. As illustrated in the example, the spring 17 is employed in apertures 45 and 47 in the valve member 15 and the body 13, the apertures having diameters of about 0.421 inch.

A removable filter 51 is provided for filtering of the fluid. When a gaseous fluid such as oxygen or a fuel such as acetylene is employed, the filter 51 employs a screen 53 that has a fineness of, for example, about 100 mesh per inch.

A tubular hat-like seat 55 is provided to seal against the end of a torch or the like to prevent leakage of the fluid when the thread 57 engages the thread on the torch.

The operation of the check valve will be described with respect to use in conjunction with a torch; such as, a cutting or welding torch; although the principle of operation is the same regardless of the application. In torches, gases normally separated in individual hoses can become mixed in one hose, creating a combustible mixture. This may occur when the torch tip becomes clogged or when one cylinder empties during use, causing the higher pressure gas to back up into the other hose. The gases, when mixed in such a combustible mixture, will rapidly burn back into the hose once the torch is relighted, commonly referred to as a flashback. Since the burning condition is uncontrolled, an explosion may take place in the hose; in the regulator; or, deadlist of all, in the cylinder; sometimes resulting in loss of life, limb and profits. The use of the check valve of this invention provides the safety features delineated in the desirable features hereinbefore and summarized at the end hereinafter. Specifically, the particular gas flows through the inlet bore 19, is cleansed as it passes through the filter 51 and opens the valve member 15 against the weak biasing means 17. The fluid thus flows past the seat 37 and O-ring 41 and through the longitudinally extending passageways 43. Because of the close tolerances between the exterior surface of the valve member 15 and the interior walls of the valve chamber 23, and because the axes of the longitudinally extending passageways 43 make an angle $\alpha$ of less than 30° with the longitudinal axis of the valve member 15, there is neither lateral nor longitudinal oscillation of the valve member 15. Consequently, the gases flow smoothly to the flame in the torch and no difficulties with flutter of the flame is experienced because of oscillation of the valve member 15, even though it has low mass and little inertia such that it would normally be susceptible to the oscillation due to the turbulence of the fluid flowing therepast.

Moreover, because of the low mass, or low inertia of the valve member 15, and the low biasing force of the biasing member 17, the check valve will open against a surprisingly low differential pressure; in the example given hereinbefore, about one ounce per square inch. Because of the low inertia of the valve member 15, it will reseat, or close, if gases attempt to flow in the opposite direction; for example, with only a reverse differential pressure of about one ounce per square inch across the valve member 15. Thus, a reversal of flow is prevented, with alleviation of the problem of flashback or backflow of fluids through the check valve 11.

Thus, in summary, it can be seen that the check valve of this invention prevents a reverse flow of gases; filters the inlet gas to prevent contaminates from clogging the fine tips or apertures on torches; effects full flow at pressure differentials as low as one ounce per square inch across the check valve; provides minimum flow restriction and turbulence; fits all the conventional manufacturer's torches; and, because it is the lightest check valve available, will not adversely affect torch balance. Most importantly, the invention provides all the desirable features delineated hereinbefore and obviates the disadvantages of the prior art check valves. Specifically, the check valve is ideal for use with low pressure gases, since it does not have the oscillation, lateral or longitudinal, attendent to this type of valve. It can be employed also with high pressure gases. The torch models are color coded with permanently colored anodized aluminum for convenience of the user in assembly and repair on the respective lines.

Although this invention has been described with a certain degree of particularity, it is understood that the present disclosure has been made only by way of example and that numerous changes in the details of construction and the combination and arrangement of parts may be resorted to without departing from the spirit and the scope of the invention.

What is claimed is:

1. A check valve for applications, such as with torches, where opening and closing at low differential pressure and elimination of flutter are requirements, comprising:
    a. a tubular body having longitudinally extending bores at each end and a valve chamber intermediate each end; the inlet bore having an internal diameter smaller than the internal diameter of the valve chamber said body defining at the end of said inlet bore adjacent said valve chamber a seat for a nose portion of a valve member;
    b. a valve member in said chamber in said valve body, said valve member having a nose portion having resilient seal means for sealingly seating against said seat when reverse flow is attempted through said check valve; said resilient seal means being soft enough to seal against said seat at low differential pressures of no more than three ounces per square inch; said valve member being formed of a lightweight material having a density of less than 2.5 grams per cubic centimeter such that it has a low inertia and having an elongate cylindrical base portion that conformingly fits within said chamber with a clearance that is sufficiently small along its entire length that flutter of the lightweight valve member is prevented, said valve member being movable longitudinally of said chamber in response to a low differential pressure less than said three ounces per square inch thereacross and having a plurality of elongate passageways extending substantially longitudinally of said elongate base portion; said plurality of passageways in said base portion having a total cross sectional area that is open for flow that is at least equal to the cross sectional area of said inlet bore such that very little pressure drop is experienced across said valve member in the open position; said longitudinally extending passageways extending through said elongate base portion at an angle of less than 30° with respect to the longitudinal axis of said valve member and having substantially uniform diameter throughout and terminating at the base end of said valve member opposite said nose portion without abruptly changing diameter within said valve member such that minimal tubulence is created in the flow of a fluid therethrough; and
    c. weak biasing means biasing said valve member toward said seat by acting on said base end; said valve member and said weak biasing means being chosen such that said valve member will open and will seat with a differential pressure thereacross in the respective directions of no more than three ounces per square inch;

whereby said check valve can be employed and alleviate the problems with flutter, such as flame flutter in a torch.

2. The check valve of claim 1 wherein said valve member is made of a thermoplastic material and said weak biasing means comprises a weak spring that is chosen such that said valve member will open and seat at about one ounce per square inch pressure differential in the respective directions.

3. The check valve of claim 2 wherein said seal means has a durometer hardness of about 70 for effecting a seal with said seat at the low differential pressure effecting reseating of said valve member.

4. The check valve of claim 2 wherein said tubular valve body has a two-piece configuration, wherein said valve chamber is dimensioned such that its diameter has an engineering tolerance within the range of only 0.000 to −0.005 inch; and wherein said valve member is dimensioned such that its diameter is within an engineering tolerance of 0.000 to +0.003 inch to alleviate the problems with oscillation of the valve member in said valve chamber.

5. The check valve of claim 2 wherein said body is made of green anodized aluminum.

6. The check valve of claim 2 wherein said body is made of red anodized aluminum.

* * * * *